US012479181B1

(12) United States Patent
Cardoso

(10) Patent No.: US 12,479,181 B1
(45) Date of Patent: Nov. 25, 2025

(54) BLANK JOINING MODULE

(71) Applicant: BOBST MEX SA, Mex (CH)

(72) Inventor: Bryan Cardoso, Pully (CH)

(73) Assignee: BOBST MEX SA, Mex (CH)

( * ) Notice: Subject to any disclaimer, the term of this patent is extended or adjusted under 35 U.S.C. 154(b) by 0 days.

(21) Appl. No.: 18/874,705

(22) PCT Filed: Jun. 29, 2023

(86) PCT No.: PCT/EP2023/067816
§ 371 (c)(1),
(2) Date: Dec. 13, 2024

(87) PCT Pub. No.: WO2024/003248
PCT Pub. Date: Jan. 4, 2024

(30) Foreign Application Priority Data

Jun. 30, 2022 (EP) .................................... 22182154

(51) Int. Cl.
*B31B 50/00* (2017.01)
*B31B 50/04* (2017.01)
*B31B 50/60* (2017.01)
*B31B 110/35* (2017.01)

(52) U.S. Cl.
CPC .......... *B31B 50/044* (2017.08); *B31B 50/006* (2017.08); *B31B 50/042* (2017.08); *B31B 50/60* (2017.08); *B31B 2110/35* (2017.08)

(58) Field of Classification Search
CPC ..... B31B 50/044; B31B 50/60; B31B 50/006; B31B 50/042; B31B 2110/35; B31B 50/00; B31B 2100/00; B31B 50/262; B31B 2100/0022; B31B 50/005
USPC ..... 493/3, 128, 416, 418, 71, 151, 162, 180, 493/183, 438, 450, 89, 11, 110, 119, 12
See application file for complete search history.

(56) References Cited

U.S. PATENT DOCUMENTS 5,224,919 A * 7/1993 Walsh ..................... B31B 50/00 493/110
2002/0077236 A1* 6/2002 Chalendar ............... B31B 50/00 493/19

FOREIGN PATENT DOCUMENTS

| | | | | |
|---|---|---|---|---|
| CN | 113199802 A | 8/2021 | | |
| CN | 215095961 U | 12/2021 | | |
| EP | 2072241 A2 | 6/2009 | | |
| JP | 2012213874 A | * 11/2012 | ............. | B31B 50/04 |

* cited by examiner

*Primary Examiner* — Jacob A Smith
(74) *Attorney, Agent, or Firm* — Bookoff McAndrews, PLLC

(57) ABSTRACT

The present invention relates to a blank joining module (10) comprising an upper feeder device (32*b*) and a lower feeder device (32*a*), an upper transfer conveyor (84) configured to transport an upper blank (2*b*) and a lower transfer conveyor (82) configured to transport a lower blank (2*a*) towards a junction point (J) where the upper blank is superposed onto the lower blank. The lower transfer conveyor is provided with an inlet portion (83*a*) and an outlet portion (83*b*) and wherein the outlet portion is located downstream of the junction point. The upper transfer conveyor is located vertically above the lower transfer conveyor and comprises a funnel-shaped inlet portion (88*a*) and horizontal outlet portion (88*b*).

12 Claims, 11 Drawing Sheets

BLANK JOINING MODULE

CROSS-REFERENCE TO RELATED APPLICATION

This application is a National Stage Application under 35 U.S.C. § 371 of International Application No. PCT/EP2023/067816, filed on Jun. 29, 2023, which claims priority to European Application No. 22182154.9, filed on Jun. 30, 2022, the entireties of which are incorporated herein by reference.

FIELD OF THE INVENTION

The present invention relates to a converting machine for producing folding boxes and other similar packaging containers. In particular it relates to blank joining module configured to join two blanks before folding the blanks in unison.

BACKGROUND

Converting machines such as folder-gluers are used in the production of packaging items such as paperboard and cardboard boxes. These machines comprise a plurality of workstations which may fold and glue blanks to form boxes and then count, stack and condition the boxes into batches.

Folder-gluer machines can be configured to produce many different types of folding boxes and packaging containers. One type of box which is composed from two blanks joined together is often referred to as a "shelf-ready" box. The shelf-ready box comprises an outer blank and an inner blank folded and glued together. The inner blank may serve as an inner container for the item to be stored, while the outer blank may serve as protection during transportation. This type of box is frequently used in supermarkets and shops, where the inner container is placed on a shelf with the items left inside.

When producing packaging containers from several blanks joined together, a blank joining module with a double feeder is needed. Specifically, a first and a second blank each need a dedicated feeder. An example of a blank joining module comprising a double feeder is described in document EP2072241.

The first and a second blanks need to be glued and pressed together in a junction point such that they form a composed and unitary blank. However, there is a risk of bending and breaking the cellulose fibers of the blanks in the junction point.

SUMMARY

In view of the above, it is an object of the present invention to ensure a correct alignment and joining of an upper and lower blank while reducing the risk of damaging the composed blank.

This object is solved by a blank joining module according to claim 1.

According to a first aspect of the present invention, there is provided a blank joining module comprising an upper feeder device and a lower feeder device, each feeder device being configured to feed a respective first and second blank in a direction of transportation. The blank joining module comprising a joining transfer comprising a lower transfer conveyor and an upper transfer conveyor, wherein the lower transfer conveyor comprises an inlet portion configured to transport a lower blank towards a junction point where the upper blank is positioned onto the lower blank such as to form a composed blank. The lower transfer conveyor further comprises an outlet portion located downstream of the junction point.

The upper transfer conveyor comprises a downwardly sloping inlet portion located upstream of the junction point in the direction of transportation and a horizontal outlet portion.

The upper transfer conveyor comprises an upper conveyor belt and wherein a contact roller is located in the junction point, the contact roller being configured to indirectly apply pressure to the composed blank by pressing onto an inner periphery of the upper conveyor belt, and wherein the contact roller is attached to a linearly movable piston rod.

The direction of transportation can be defined as a horizontal direction extending from the upper and lower feeder devices to the junction point. The direction of transportation preferably coincides with the longitudinal direction of the converting machine. The direction of transportation extends between an inlet and an outlet of the converting machine. The direction of transportation may thus extend all the way from the upper and lower feeder devices to a folding and gluing module of the converting machine, and further downstream to a delivery module of the converting machine.

The present invention is based on a realization that the alignment and joining of two blanks can be improved by providing a seamless and optimized trajectory of the upper blank in the junction point for the two blanks.

In an embodiment, the outlet portion of the upper transfer conveyor is parallel to the outlet portion of the lower transfer conveyor such that the composed blank can be received between the respective outlet portions of the upper and lower transfer conveyors.

The composed blank is preferably pinched between the outlet portion of the lower transfer conveyor and the horizontal outlet portion of the upper transfer conveyor.

The conveyor belt of the upper transfer conveyor preferably extends further upstream in the direction of transportation than the junction point.

The conveyor belt forms a loop which is provided with an outer periphery and an inner periphery. The contact roller is pressing against the inner periphery of the conveyor belt such as to indirectly apply pressure to the blank. The outer periphery is in contact with the blank and drives the blank, while the inner periphery is not in contact with the blank. In an embodiment, the contact roller is attached to a hydraulic or pneumatic piston rod, and the contact roller is linearly movable.

In an exemplary embodiment, the axis of the pneumatic piston rod is arranged at angle in relation to the vertical direction, and wherein the angle is selected to be about 50% of a slope angle of the downwardly sloping inlet portion in relation to the horizontal direction.

The vertical direction is in the gravitational direction. The horizontal direction is in a direction perpendicular to the vertical direction.

In an embodiment, the angle of the axis of the piston rod is between 5° and 10°, preferably about 7.5°.

The downwardly sloping inlet portion may be formed by a distal inlet roller and the contact roller. The distal inlet roller is preferably arranged upstream of the contact roller in the direction of transportation and above the contact roller in the direction of transportation. The conveyor belt is preferably guided by the contact roller and distal inlet roller.

The distal inlet roller of the upper transfer conveyor may be attached to a movable frame, and wherein the movable frame is adjustable such that the slope angle of the funnel-shaped portion is modifiable.

The upper transfer conveyor may be arranged downstream of a transportation conveyor, and wherein the funnel-shaped inlet portion of the upper transfer conveyor is arranged at the same slope angle as the transportation conveyor in relation to the horizontal direction.

The transportation conveyor may be an upper register conveyor. The upper register conveyor may comprise a conveyor belt and a slider. The slider can be a low-friction surface or a line of idle rollers.

In an embodiment, the lower transfer conveyor comprises a conveyor belt provided with apertures, and wherein at least one suction box is located in the inlet portion of the lower transfer conveyor and upstream of the junction point.

In an embodiment, the lower transfer conveyor comprises an outlet portion having a variable length in the direction of transportation. The outlet portion of the lower transfer conveyor may be provided with a plurality of idle rollers.

The idle rollers in the outlet portion may be attached to frame provided with a fixed length. This allows the composed blank to be completely glued and joined together before the front leading edge of the composed blank arrives in the downstream-located fold pre-breaking module.

In an embodiment, the contact pressure of the contact roller is adjustable from a user interface.

BRIEF DESCRIPTION OF THE DRAWINGS

The invention will now be described with reference to the appended drawings, in which like features are denoted with the same reference numbers and in which.

DETAILED DESCRIPTION

Figure 1:
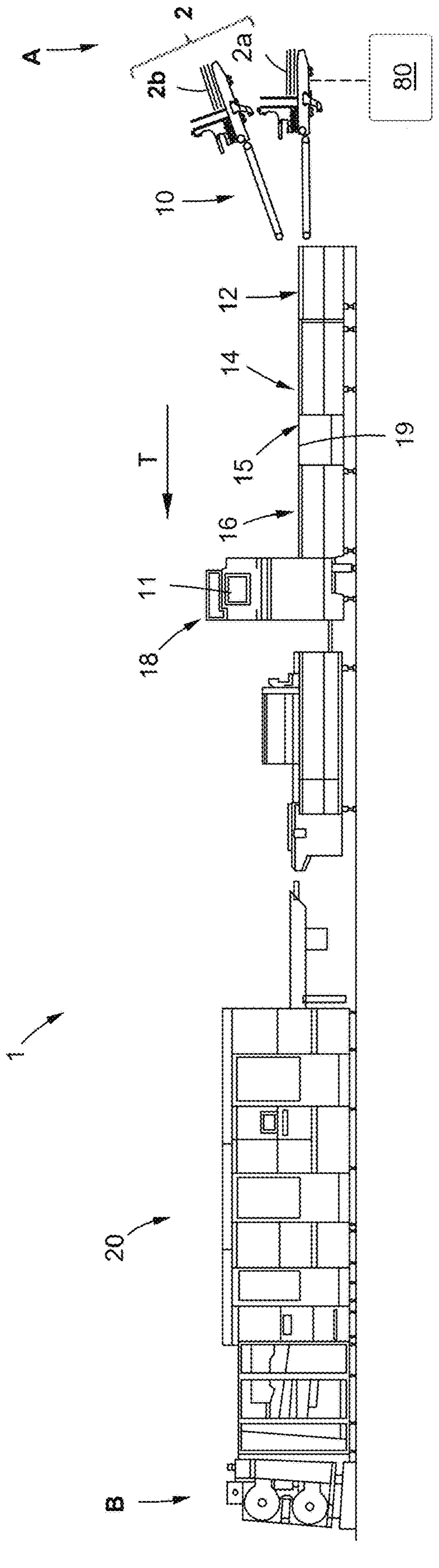
FIG. 1 is a schematic view of a converting machine in the configuration of a folder gluer.

Referring to the figures and in particular to FIG. 1 which illustrates a converting machine 1 in the form of a folder-gluer machine 1. The folder-gluer machine 1 is configured to receive a first and a second stacks of blanks 2, join the blanks from each stack to form a composed blank 2' and then fold the composed blank 2' to form folding boxes 2" or other composed packaging containers.

Figure 2B:
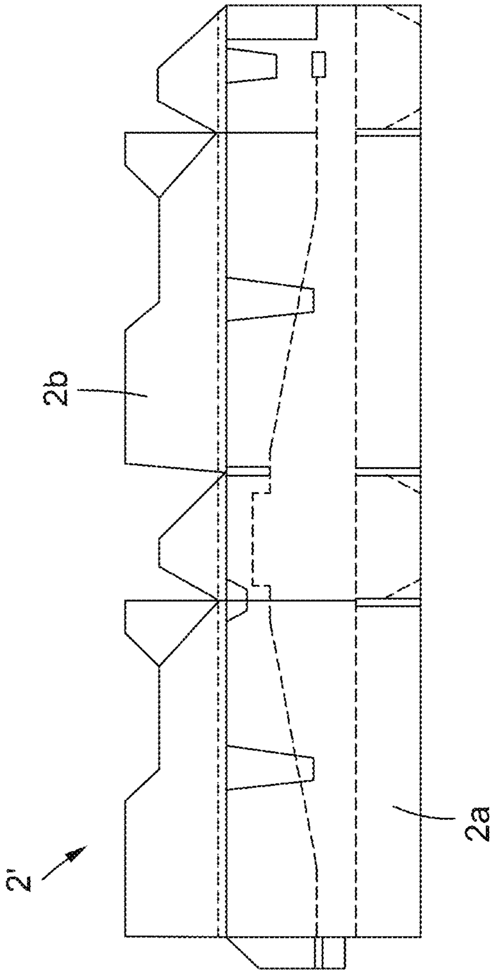
FIG. 2*b* is a planar view of a composed blank for producing the folding box of FIG. 2*a;*
Figure 2A:
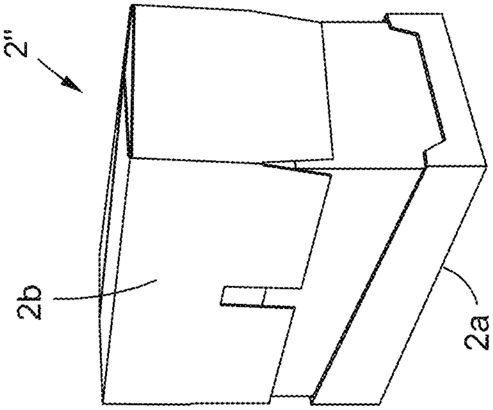
FIG. 2*a* is schematic perspective view of a folding box in the configuration of a shelf-ready box.

There are several types of boxes 2" and packaging containers which can be produced in a folder-gluer machine 1. One type of such a box 2" is illustrated in FIGS. 2*a* and 2*b* and may be referred to as "shelf-ready" box 2". This type of box 2" is composed from two blanks 2*b*, 2*a* joined together. One blank 2*a* may form an inner container and the other blank 2*b* may form an outer container. In use, the outer container can be manually removed while the inner container is holding the items to be stored.

As illustrated in FIG. 1, the present folder-gluer machine 1 comprises a series of different workstations in the form of modules. The modules may include, in a direction of transportation T extending from an inlet A to an outlet B: a blank joining module 10, a fold pre-breaking module 12, a gluing module 15 and a folding module 16. The folder-gluer machine 1 may further comprise a main user interface 11 and a quality control system 18. After the gluing and folding modules, a delivery module and conditioning section 20 can be provided in order to count and separate a shingled stream of folding boxes 2' into separate batches. The converting machine 1 further comprises a conveyance system 19 comprising conveyors such as endless belts and rollers configured to transport the first and second blanks 2*a*, 2*b* in a direction of transportation T. The converting machine 1 also comprises a control circuitry 80 configured to control the operation of the blank-joining module 10.

Figure 3:
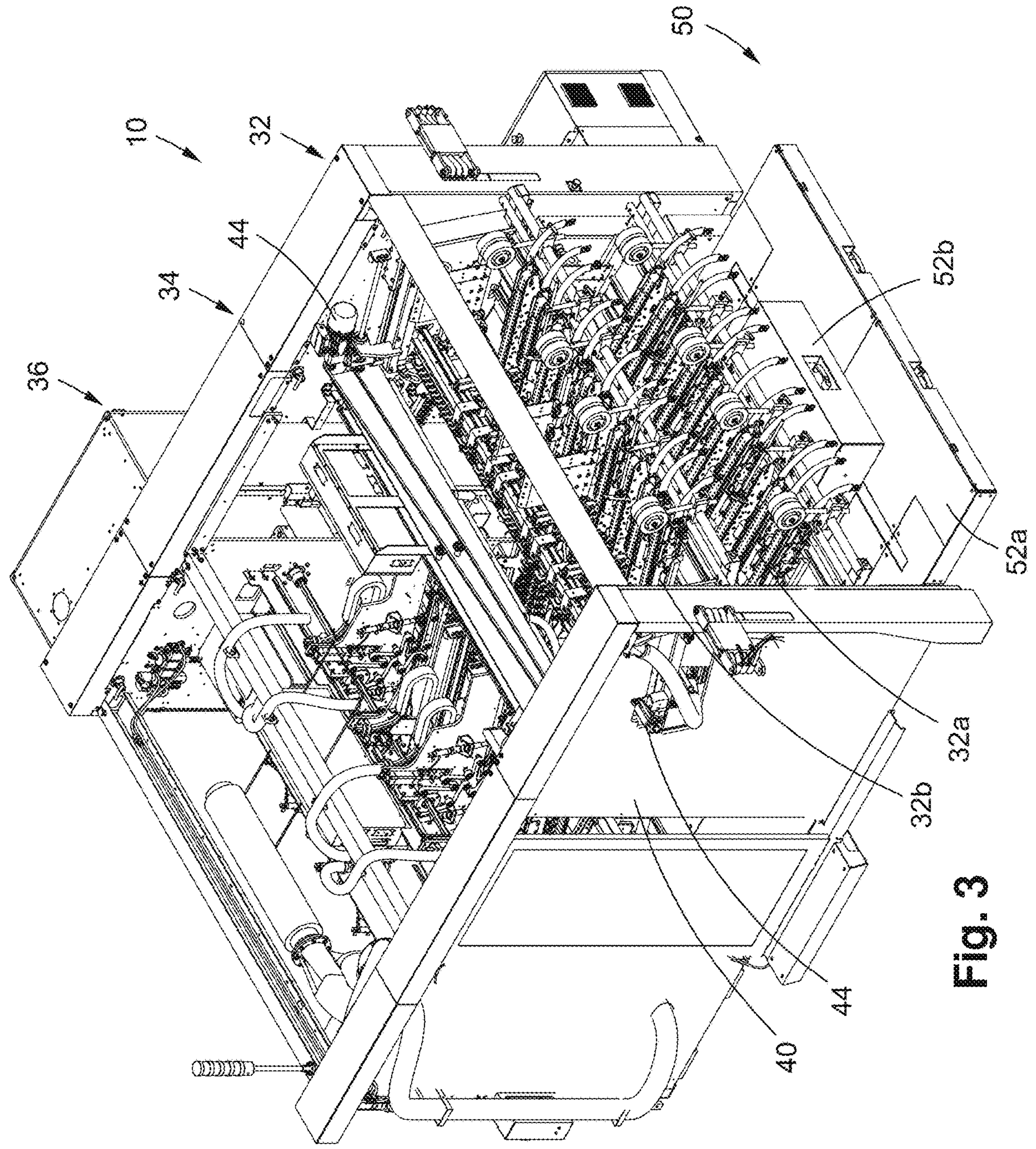
FIG. 3 is a schematic perspective view of a blank-joining module according to an embodiment of the present invention.
Figure 4:
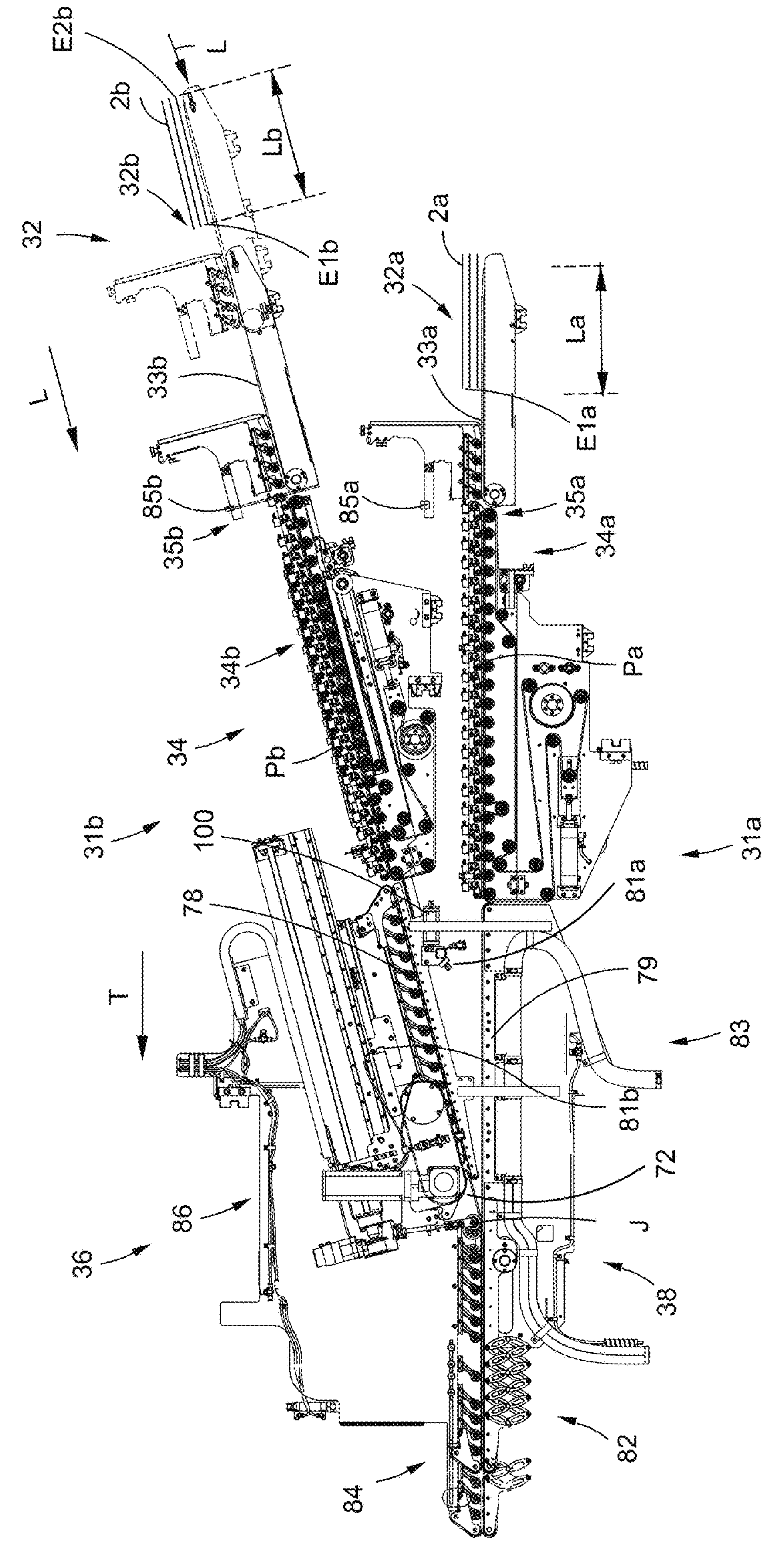
FIG. 4 is a cross-sectional schematic view of the blank-joining module of FIG. 3.

The blank joining module 10 enables the folder-gluer 1 to produce the composed blank 2'. As illustrated in FIGS. 3 and 4, the blank joining module 10 comprises a feeder unit 32, an alignment unit 34, a gluing device 100, a register control arrangement 36, and a joining transfer 38.

As best seen in FIGS. 3 and 4, the feeder unit 32 comprises a lower feeder device 32*a* and an upper feeder device 32*b*. The upper and lower feeder devices 32*b*, 32*a* are configured to respectively feed the blanks 2*a*, 2*b* one by one in the direction of transportation T.

The upper feeder device 32*b* is configured to feed a first blank 2*b*, also referred to as an "upper blank" 2*b*, from a stack positioned on an upper loading surface 33*b*. The lower feeder device 32*a* is configured to feed a second blank 2*a*, also referred to as a "lower blank" 2*a* from a stack positioned on a lower loading surface 33*a* in the lower feeder device 32*a*.

The upper loading surface 33*b* is located vertically above the lower loading surface 33*a*. To facilitate the access to the upper loading surface 33*b*, the upper feeder device 32*b* can be displaceable in a longitudinal direction L and in the direction of transportation T. The longitudinal direction L is defined by the longitudinal extension of the upper loading surface 33*b*. The longitudinal direction L is thus downwardly sloping in the direction of transportation T. In such a way, the upper loading surface 33*b* can be displaced into a horizontally offset position in relation to the lower loading surface 33*a*. This may allow the rear edge of the blanks 2*b* on the upper loading surface 33*b* to be vertically aligned with the rear edge of the blanks 2*a* on the lower loading surface 33*a*. The upper loading surface 33*b* can thus be moved further upstream in the direction of transportation T. This allows the upper loading surface 33*a* to be moved closer to a machine operator.

As illustrated in FIG. 4, the alignment unit 34 is arranged downstream in the direction of transportation T of the feeder unit 32. The alignment unit 34 is configured to laterally align the upper blank 2*b* and the lower blank 2*a* to their respective predefined lateral positions. Hence, the alignment unit 34 is configured to align the upper and lower blanks 2*b*, 2*a* in a direction perpendicular to the direction of transportation T. In such a way, the upper blank 2*b* and the lower blank 2*a* are in the correct lateral positions when the blanks 2*a*, 2*b* are brought into contact with each other in a junction point J. The correct lateral positions allows the upper and lower blanks 2*b*, 2*a* to be assembled according to predefined assembly instructions.

The gluing device 100 is located upstream of the junction point J. The gluing device 100 is arranged to dispense glue on the top side of the lower blank 2*a* such that the glue is positioned in-between the upper blank 2*b* and the lower blank 2*a*.

The alignment unit 34 comprises an upper alignment device 34*b* configured to align the upper blank 2*b* and a lower alignment device 34*a* configured to align the lower blank 2*a*. The upper and lower alignment devices 34*b*, 34*a* are provided with a respective distal upstream connection end 35*b*, 35*a* which is preferably fixedly connected to each respective upper and lower feeder devices 32*b*, 32*a*.

Figure 5:
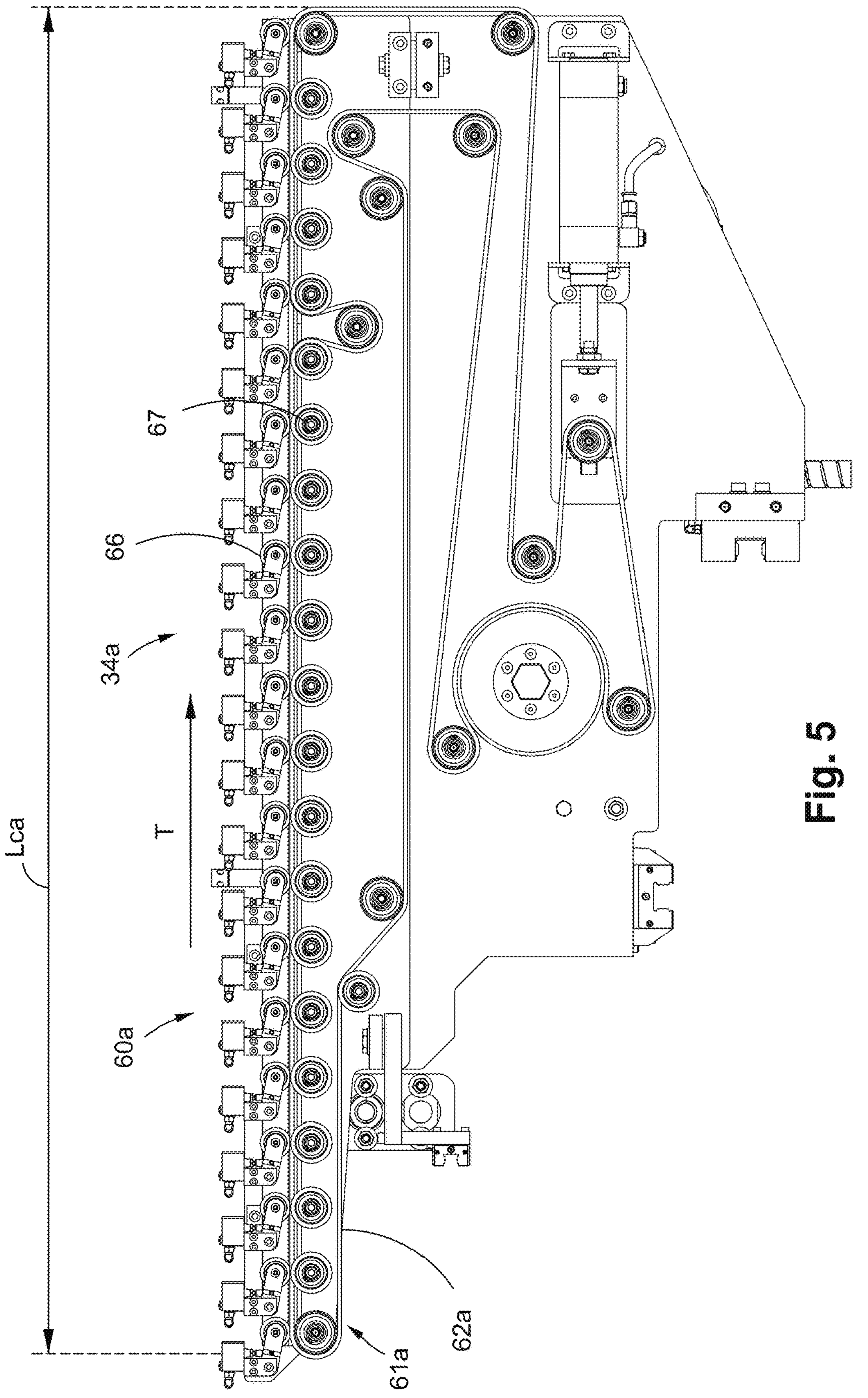
FIG. 5 is a schematic cross-sectional view of a lower alignment device of the blank joining module.

The lower alignment device 34*a* is configured to transport the lower blank 2*a* along a substantially horizontal transportation path Pa. As best seen in FIG. 5, the lower alignment device 34*a* comprises an upper pressing member 60*a*, a lower conveyor 61*a* and a guide (not shown). The lower conveyor 61*a* comprises an endless conveyor belt 62*a* having a contact length Lca configured to be in contact with and drive the lower blank 2*a* forward in the direction of transportation T.

Figure 6A:
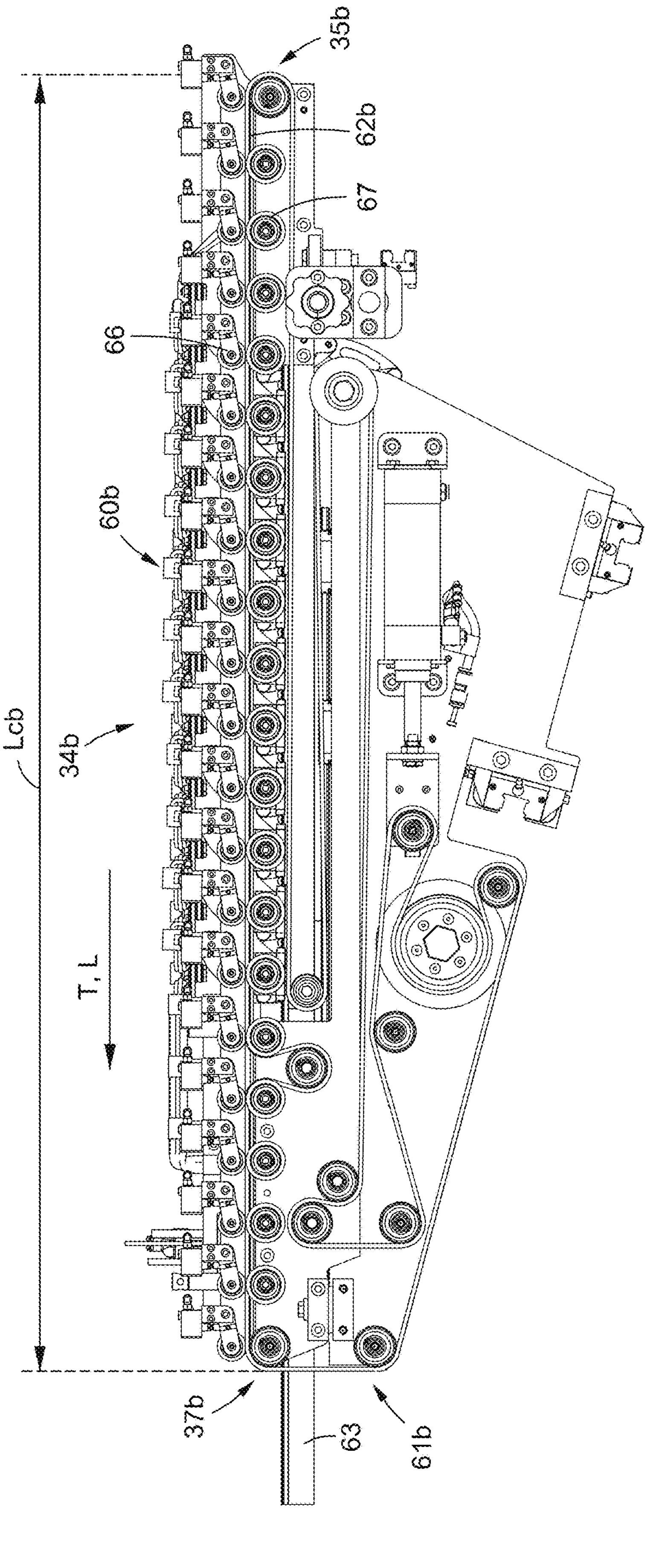
FIGS. 6*a* and 6*b* are schematic cross-sectional views of an upper alignment device of the blank joining module from a first side and from a second side, respectively.
Figure 6B:
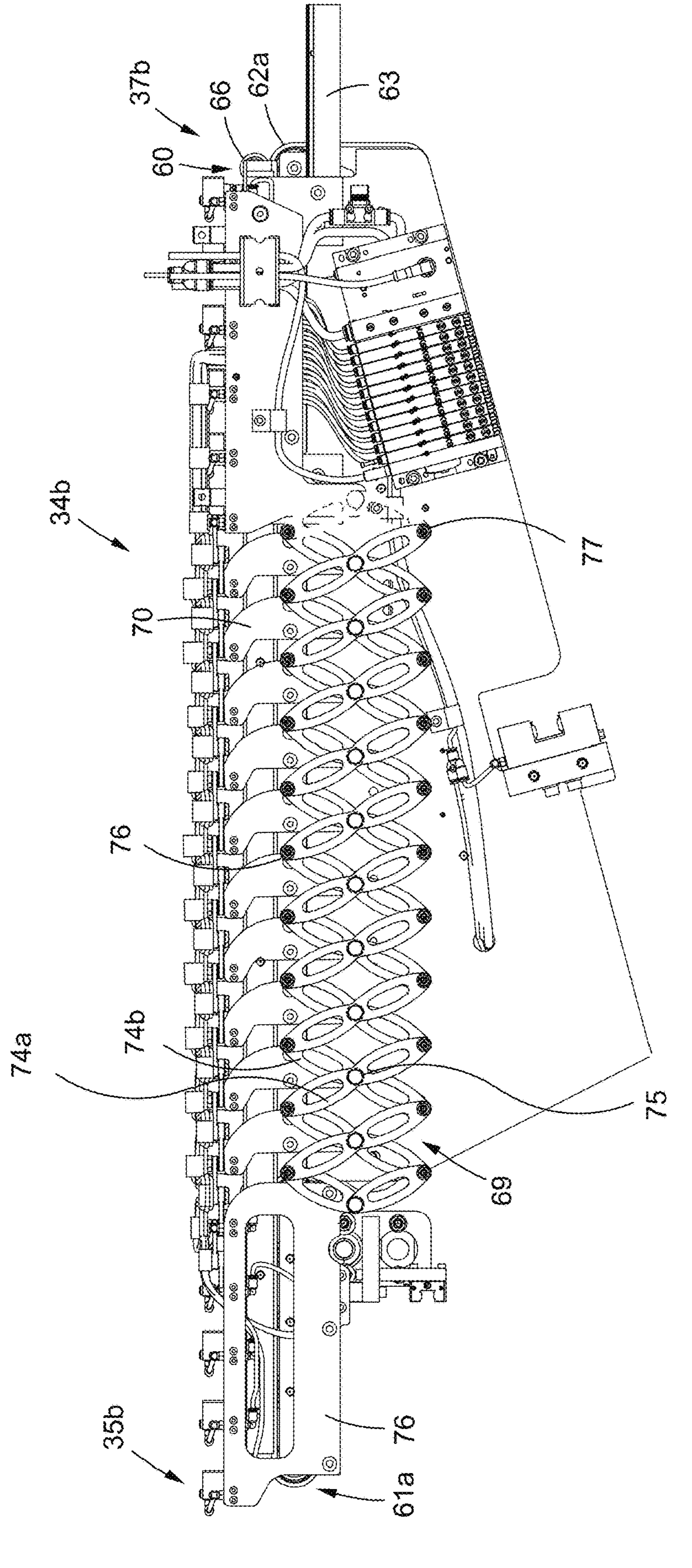
Figure 6C:
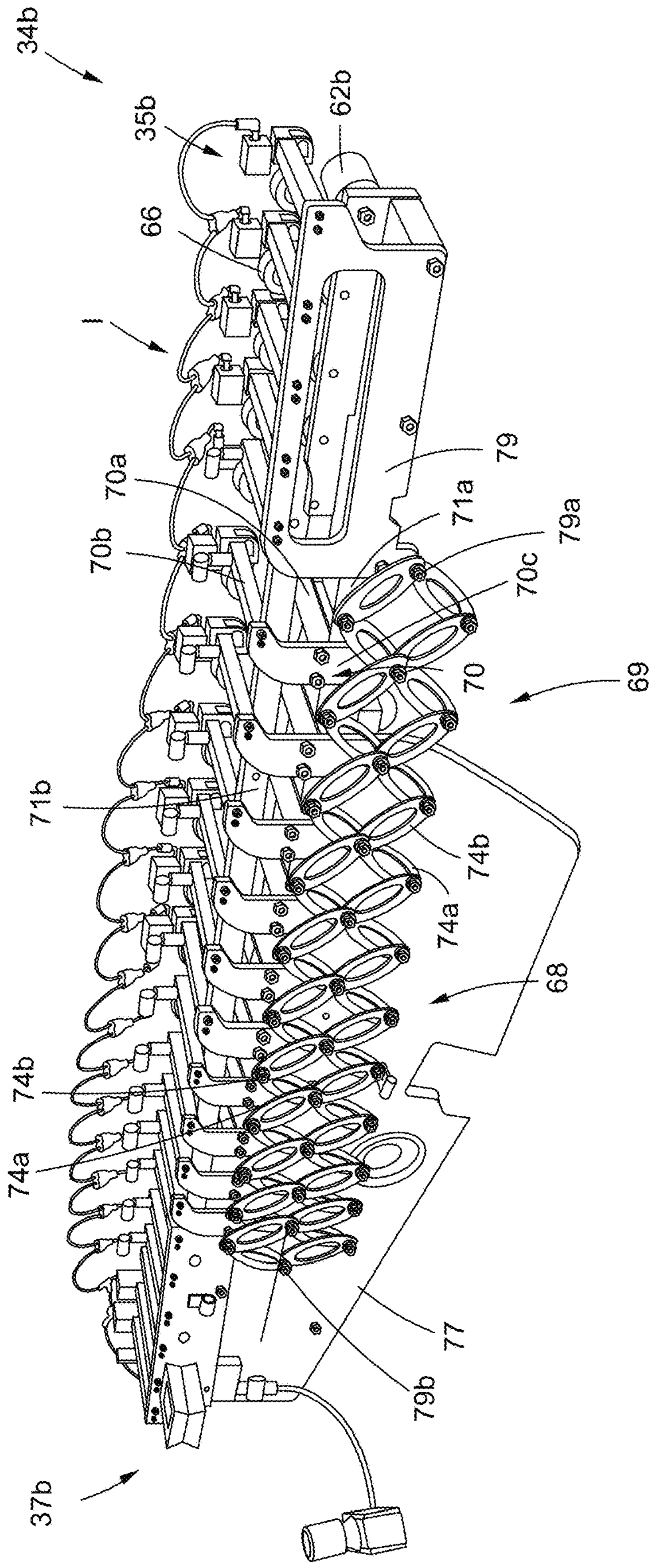
FIG. 6*c* is a schematic perspective view of the upper alignment device of FIGS. 6*a* and 6*b;*

As best seen in FIGS. 6*a* to 6*c*, the upper alignment device 34*b* comprises an upper pressing member 60*b*, and an upper conveyor 61*b*. The upper conveyor 61*b* comprises an endless conveyor belt 62*b* having a contact length Lcb configured to be in contact with and drive the upper blank 2*b* forward in the direction of transportation T. A guide 63 is arranged with its longitudinal extension coinciding with the direction of transportation T. The upper pressing member 60*b* and the upper conveyor 61*b* are arranged at an angle in relation to the direction of transportation T such as to direct a lateral edge of the lower blanks 2*a* against the guide 63.

The upper alignment device 34*b* is thus configured similarly to the lower alignment device 34*a*. However, the upper alignment device 34*b* is provided with a variable contact length Lcb in the direction of transportation T. The upper alignment device 34*b* further comprises a mobile distal end 35*a* connected to the upper feeder device 32*b* and a fixed distal end 37*b* connected to the structural frame 40 of the blank joining module 10. This allows a displacement of the upper feeder device 32*b* in the longitudinal direction L while maintaining a fixed connection to the upper alignment device 34*b*.

As illustrated in FIGS. 6*b* and 6*c*, the upper conveyor 61*b* of the upper alignment device 34*b* further comprises a support structure 69 configured to support the conveyor belt 62*b*. The support structure 69 comprises a plurality of guiding rollers 67 (see FIG. 6*a*) onto which the conveyor belt 62*b* is mounted. The guiding rollers 67 are attached to frame members 70. A connection mechanism 68 is connecting adjacent frame members 70 to each other. The connection mechanism 68 is expandable such that the distance between the frame members 70 can be modified. The frame members 70 are displaceable in the direction of transportation T. Each guiding roller 67 is attached to a frame member 70 and arranged in a line. The connection mechanism 68 permits a modification of the contact length Lcb, while all guiding rollers 67 remain in contact with the upper blanks 2*b*.

Preferably, the connection mechanism 68 comprises a plurality of pivotable links 74*a*, 74*b* which allow an equidistant displacement of the frame members 70. The pivotable connection links 74*a*, 74*b* can be provided by two linear elements. The pivotable connection links 74*a*, 74*b* are connected to each frame member 70 in a central pivot 75. The pivotable connection links 74*a*, 74*b* are also connected to each other in an upper pivot 76 and a lower pivot 77. The upper pivot 76 and the lower pivot 77 are movable in the longitudinal direction L.

By connecting the frame members 70 to the central pivot 75, the horizontal position of the central pivot 75 is kept constant.

Each frame member 70 further comprises a first cantilevered extension 70*a* and a second cantilevered extension 70*b* which are connected to a frame member bracket 70*c*.

The guiding rollers 67 of the conveyor belt 62*b* are attached to the first cantilevered extension 70*a*, and the pressing rollers 66 are attached to the second cantilevered extension 70*b*. The first and second cantilevered extensions 70*a*, 70*b* extend horizontally and parallel in relation to each other. The second cantilevered extension 70*b* is arranged vertically above the first cantilevered extension 70*a*.

The second cantilevered extension 70*b* may be supported by an upper guide rail 71*b* and the second cantilevered extension 70*b* may be supported by a lower guide rail 71*a*. The guide rails 71*a*, 71*b* may be in the form of longitudinal bars arranged underneath the first and second cantilevered extensions 70*a*, 70*b*, respectively.

The support structure has a first distal end 35*b* connected to the upper feeder device 32*b* and a second distal end 37*b* connected to the frame 40 of the blank joining module 10.

The distal inlet end 35*b* of the upper alignment device 34*b* may comprise an attachment bracket 79 configured to be attached to the upper feeder device 32*b*. The attachment bracket 79 may further provide a fixed structure to form an inlet section I for the upper pressing rollers 66 and guiding rollers 67 of the conveyor belt 62*b*. The attachment bracket 79 provides a fixed connection to the cantilevered extensions 70*b*, 70*c* such that the inlet section I has a constant length, regardless of the extension or retraction of the connection mechanism 68. A distal central pivot 79*a* is attached to the attachment bracket 79. A second distal central pivot 79*b* is attached to a frame member 77 of the upper alignment module 34*b*.

To further facilitate the access to the upper feeder device 32*b*, the blank joining module 10 may further comprise a modular podium 50. As best seen in FIG. 3*b*, the podium 50 comprises at least one stepping surface 52*a*. Preferably the podium 50 comprises a second stepping surface 52*b* located on top of the first stepping surface 52*a*.

A register control arrangement 36 is preferably arranged downstream of the alignment module and comprises an upper register conveyor 78 configured to transport the upper blank 2*b*. The upper register conveyor 78 may comprise a conveyor belt and a slider, in-between which the upper blank 2*b* is received. The slider can be a low-friction surface or a line of idle rollers.

The register control arrangement 36 further comprises a position correction device 72 located above the register conveyor 78. The position correction device 72 may comprise a cleat belt provided with one or a plurality of abutments. The position of the upper blank 2*b* can be corrected by contacting an abutment against the front edge E1*b* or the rear edge E2*b* of the upper blank 2*b* and either accelerating or decelerating the upper blank 2*b* in the direction of transportation T.

As best seen in FIG. 4, the joining transfer 38 is located downstream of the alignment unit 34 and comprises a lower transfer conveyor 82 and an upper transfer conveyor 84.

Figure 9A:
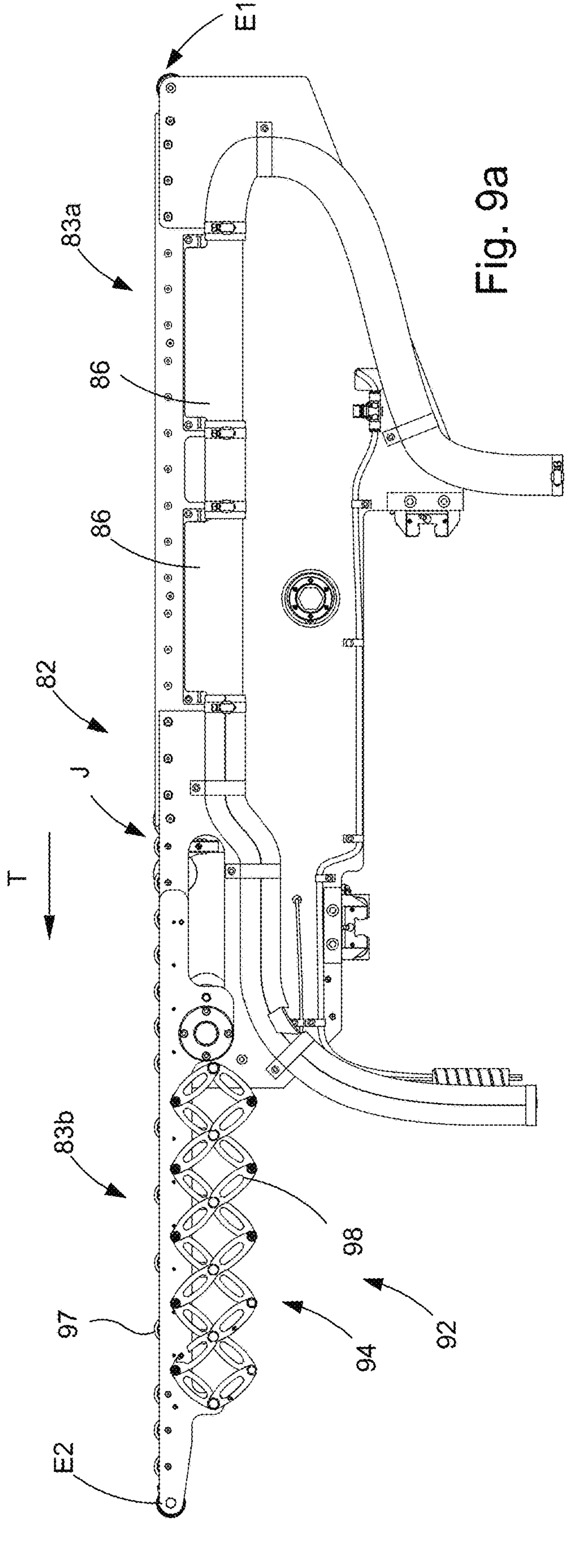
FIG. 9*a* is a cross-sectional view of a lower transfer conveyor.
Figure 9B:
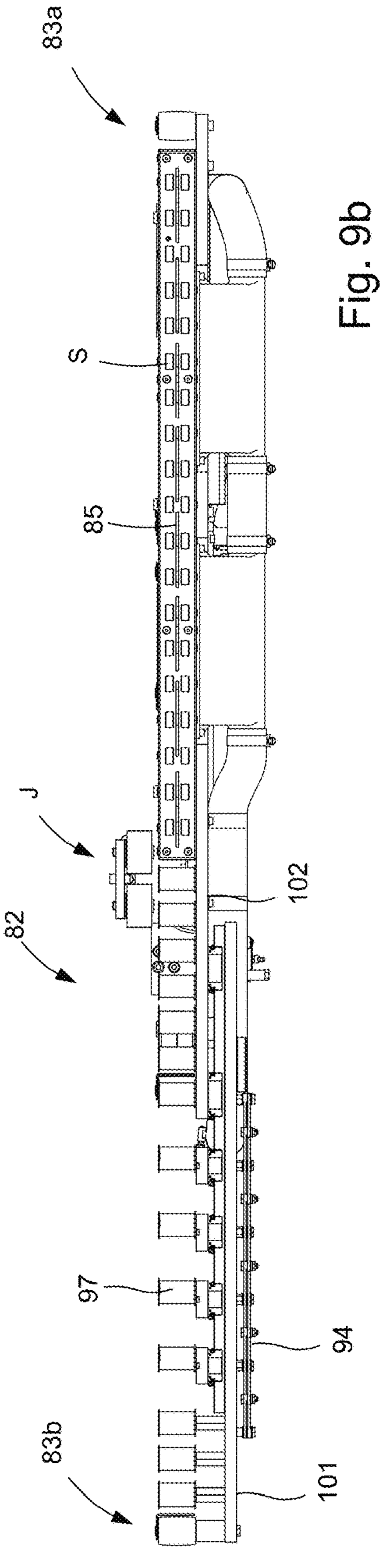
FIG. 9*b* is a top view of the lower transfer conveyor of FIG. 9*a*.

As illustrated in FIGS. 9*a* and 9*b*, the lower transfer conveyor 82 comprises an inlet portion 83*a* and an outlet portion 83*b*. The inlet portion 83*a* extends from a distal inlet end E1 located at the outlet of the lower alignment conveyor 61*a* to the junction point J.

The outlet portion 83*b* of the lower transfer conveyor 82 extends from the junction point J to a distal outlet end E2 of the lower transfer conveyor 82. After the junction point J and in the direction of transportation T, the lower transfer conveyor 82 comprises a plurality of idle rollers 97.

The inlet portion 83*a* comprises a lower conveyor belt 85 which extends from the inlet distal end E1 and to a position upstream of the junction point J. The inlet portion 83*a* may be provided with at least one suction box 86 configured to apply suction against a bottom surface of the lower blank 2*a*. The lower conveyor belt 85 is preferably provided with apertures S which allow suction to be applied to the lower blank 2*a*.

The suction box 86 restricts the movements of the lower blank 2*a* and holds the rear edge of the lower blank 2*a* until the upper blank 2*a* has been joined on top of the lower blank 2*a*.

Figure 7:
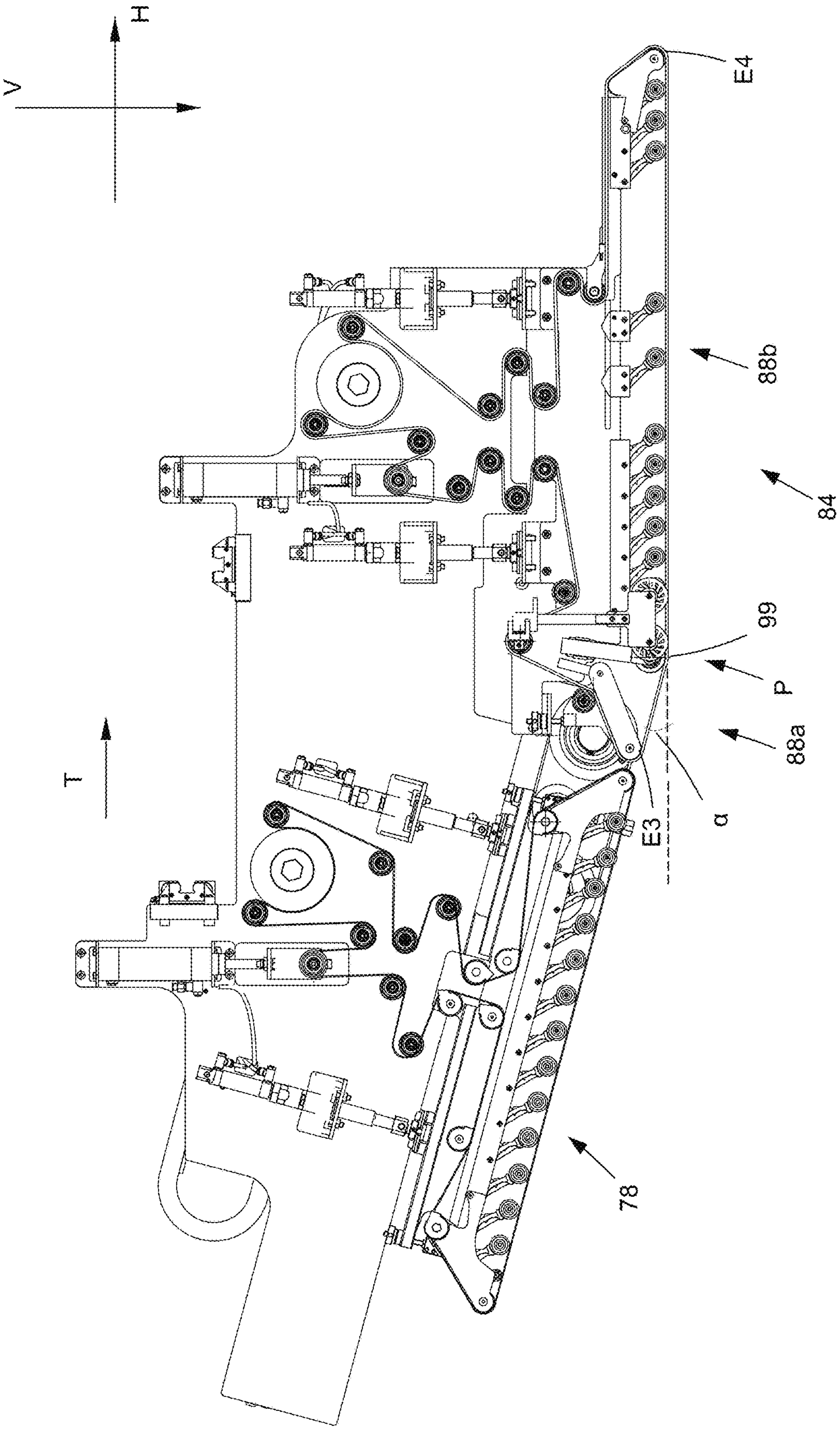
FIG. 7 is a cross-sectional view of an upper transfer conveyor and an upper register conveyor according to an embodiment of the present invention.
Figures 8A, 8B:
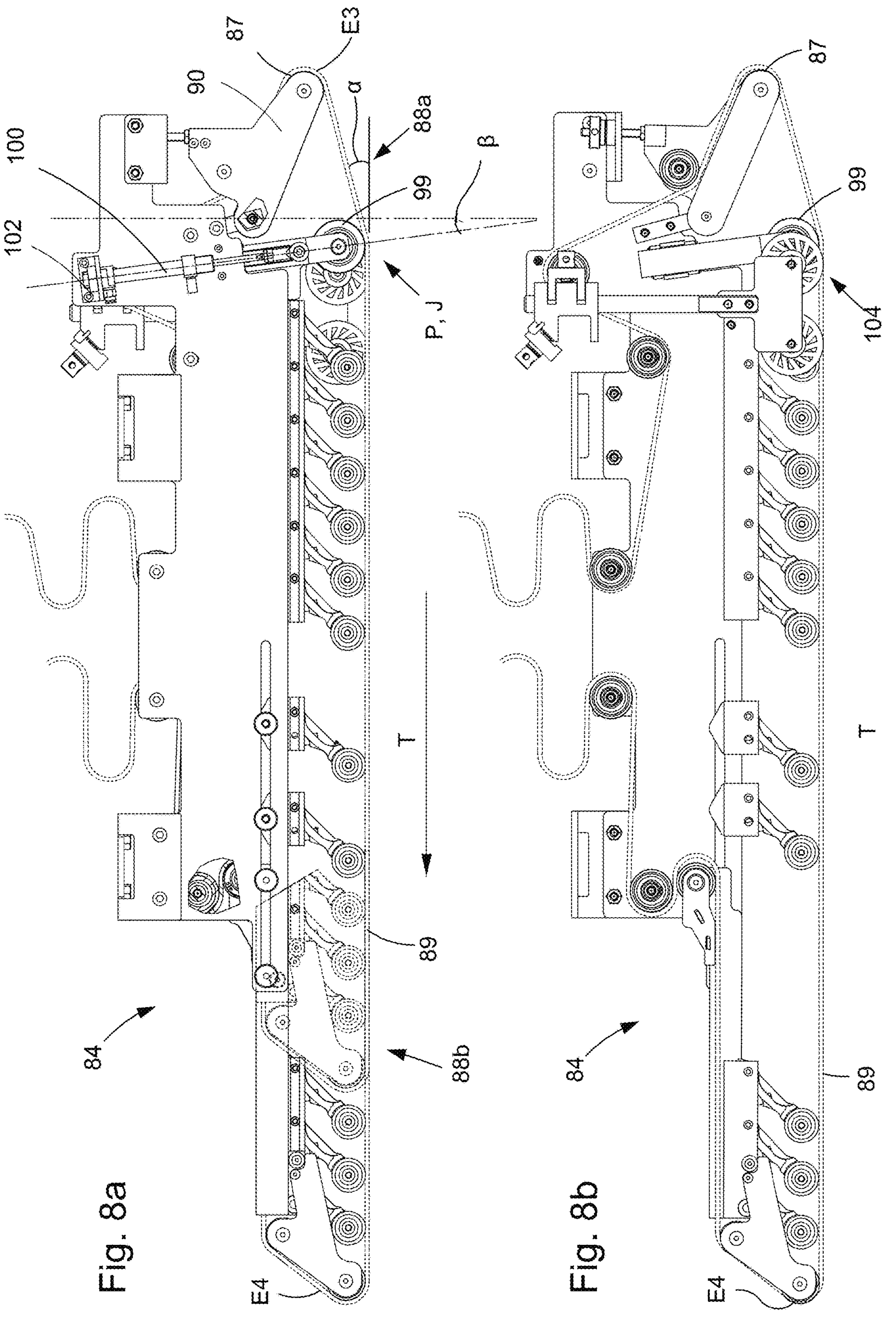
FIGS. 8*a* and 8*b* are detailed cross-sectional views from a first side and a second side of the upper transfer conveyor in FIG. 7.

As illustrated in FIGS. 7, 8*a* and 8*b*, the upper transfer conveyor 84 comprises a downwardly sloping inlet portion 88*a* and a horizontal outlet portion 88*b* in the direction of transportation T. The horizontal outlet portion 88*b* may have an extension coinciding with the horizontal direction H, or be positioned with an angle of between 0 and 15° in relation to the horizontal direction H. An upper transfer conveyor belt 89 extends from an inlet end E3 to an outlet end E4 of the upper transfer conveyor 84.

The inlet end E3 is defined by a distal inlet roller 87 which is located upstream of the junction point J in the direction of transportation T. The outlet end E4 may be vertically aligned with the distal outlet end E2 of the lower transfer conveyor 82.

A transition point P is located between the inlet portion 88*a* and the horizontal transfer portion 88*b* of the upper transfer conveyor 84 and is characterized by the change in inclination of the upper transfer conveyor belt 89 in relation to the horizontal direction H. The transition point P corresponds to the junction point J.

The inlet portion 88*a* is provided with a slope angle α. The angle α can also be referred to as the transportation angle α. The slope angle α preferably corresponds to the angle of the upstream-located upper register conveyor 78. The slope angle α is approximately between 25° and 35°, preferably 30°.

As best seen in FIG. 8*a*, the distal inlet roller 87 may be attached to a movable frame 90. The movable frame 90 may be adjustable such that the slope angle α of the inlet portion 88*a* can be changed.

The downwardly sloping inlet portion 88*a* allows the upper blank 2*b* to be seamlessly brought into contact with the upper transfer conveyor 84 and redirected to follow a substantially horizontal transportation path in the horizontal transfer portion 88*b*.

A contact roller 99 is located in the transition point P between the downwardly sloping inlet portion 88*a* and the horizontal transfer portion 88*b* of the upper transfer conveyor 84. The contact roller 99 is configured to apply pressure on the composed blank 2 in the junction point J. The contact roller 99 is indirectly applying pressure against the composed blank 2 by pressing onto the inner periphery of the upper transfer conveyor belt 89 of the upper transfer conveyor 84. This allows a distribution of the applied pressure and ensures that the transportation speed in the contact point J is constant. This also reduces any potential interference or friction from the contact roller 99.

The contact roller 99 thus positions the upper conveyor belt 89 in the transition point and defines the inclined shape of the inlet portion 88*a* together with the distal inlet roller 87.

As best seen in FIG. 8*a*, the contact roller 99 is attached to a piston rod 100 and is linearly movable. The piston rod 100 is preferably connected to a pneumatic cylinder 102. Alternatively, a hydraulic cylinder may be used.

The piston rod 100 may be arranged at angle β in relation to the vertical direction V. The angle β may be between 12.5° and 17.5°, preferably about 15°. The angle β is selected to be between 40% and 60%, preferably about 50% of the slope angle α. In such a way, the pressure applied from the contact roller 99 is gradually applied in the junction point J, which is located in the transition between the inlet portion 88*a* and the horizontal outlet portion 88*b*.

The contact pressure of the contact roller 99 may be modified based on the rigidity, the fluting and thickness of the upper and lower blanks 2*b*, 2*a*. In such a way, the pressure can be adapted to ensure contact between the upper and lower blanks 2*b*, 2*a* and to avoid rupturing of the fluting of corrugated cardboard blanks. The contact pressure may be controlled from the user interface 11. Optionally, the contact pressure may be calculated and automatically set by the control unit 91 of the blank-joining module 10. In an example, the contact pressure can be between 0 and 5 bars, preferably between 0 and 3 bars.

A double flexing roller 104 may be located downstream of the contact roller 99. The double flexing roller 104 applies pressure to the composed blank 2 such that the glue adheres to the upper and lower blanks 2*b*, 2*a*.

Downstream of the junction point J, the lower and upper transfer conveyors 82, 84 are configured to receive the composed blank 2 in-between them and apply pressure such as to pinch the composed blank 2. The pressure can be selected such that the composed blank is pressed together to a clearance which corresponds to the thickness of the composed blank 2' and the thickness of the glue layer.

The outlet portion 83*b* of the lower transfer conveyor 82 is preferably provided with an extendable and retractable portion 92. Preferably, idle rollers 97 are attached to an extendable connection mechanism 94. The connection mechanism 94 is similar to the connection mechanism 68 provided for the upper alignment conveyor 61*b* and thus comprises a connection mechanism 94 having a plurality of pivotable links 98.

The outlet portion 83*b* comprises a first linear frame member 101 which is movable in relation to a second frame member 102. The connection mechanism 94 is connected to the first linear frame member 101 and is configured to displace the first linear frame member 101 in the direction of transportation T such that the position of the distal outlet end E2 of the lower transfer conveyor 82 is changed. In other words, the position of the distal outlet end E2 can be moved upstream and downstream in the direction of transportation T.

In such a way, the distal outlet end E2 of the lower transfer conveyor 82 may be displaceable in the direction of transportation T. Moreover, the outlet portion 83*b* of the lower transfer conveyor 82 can be provided with a length corresponding to the length of the composed box 2 in the direction of transportation T. This allows the upper blank 2*b* and the lower blank 2*a* to be completely glued and joined together before the front leading edge of the composed blank 2 arrives in the downstream-located fold pre-breaking module 12.

The invention claimed is:

1. A blank joining module comprising:

an upper feeder device and a lower feeder device, each feeder device being configured to feed a respective first and second blank in a direction of transportation;

a joining transfer comprising a lower transfer conveyor and an upper transfer conveyor, wherein the lower transfer conveyor comprises an inlet portion configured to transport a lower blank towards a junction point where an upper blank is positioned onto the lower blank such as to form a composed blank, wherein the lower transfer conveyor further comprises an outlet portion located downstream of the junction point, wherein the upper transfer conveyor comprises a downwardly sloping inlet portion located upstream of the junction point in the direction of transportation and a horizontal outlet portion, wherein the upper transfer conveyor comprises an upper conveyor belt, and wherein a contact roller is located in the junction point, the contact roller being configured to indirectly apply contact pressure to the composed blank by pressing onto an inner periphery of the upper conveyor belt, and wherein the contact roller is attached to a linearly movable piston rod.

2. The blank joining module according to claim 1, wherein the outlet portion of the upper transfer conveyor is parallel to the outlet portion of the lower transfer conveyor such that the composed blank can be received between the outlet portion of the upper transfer conveyor and the outlet portion of the lower transfer conveyor.

3. The blank joining module according to claim 1, wherein the upper conveyor belt of the upper transfer conveyor extends further upstream in the direction of transportation than the junction point.

4. The blank joining module according to claim 1, wherein an axis of the piston rod is arranged at angle in relation to a vertical direction, and wherein the angle is selected to be about 50% of a slope angle of a funnel-shaped inlet portion in relation to a horizontal direction.

5. The blank joining module according to claim 4, wherein the angle is between 5° and 10°, preferably about 7.5°.

6. The blank joining module according to claim 1, wherein the downwardly sloping inlet portion is formed by a distal inlet roller and the contact roller.

7. The blank joining module according to claim 1, wherein the upper transfer conveyor is arranged downstream of a transportation conveyor, and wherein the inlet portion of the upper transfer conveyor is arranged at a same slope angle as the transportation conveyor in relation to a horizontal direction.

8. The blank joining module according to claim 1, wherein the lower transfer conveyor comprises a conveyor belt provided with apertures, and wherein at least one suction box is located in the inlet portion of the lower transfer conveyor and upstream of the junction point.

9. The blank joining module according to claim 1, wherein the outlet portion of the lower transfer conveyor has a variable length in the direction of transportation.

10. The blank joining module according to claim 9, wherein the outlet portion of the lower transfer conveyor is provided with a plurality of idle rollers.

11. The blank joining module according to claim 10, wherein the plurality of idle rollers in the outlet portion are attached to a movable frame provided with a fixed length.

12. The blank joining module according to claim 1, wherein the contact pressure of the contact roller is adjustable from a user interface.

* * * * *